(12) United States Patent
Aggas

(10) Patent No.: US 6,336,984 B1
(45) Date of Patent: Jan. 8, 2002

(54) VACUUM IG WINDOW UNIT WITH PERIPHERAL SEAL AT LEAST PARTIALLY DIFFUSED AT TEMPER

(75) Inventor: Steven L. Aggas, Pinckney, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/404,659

(22) Filed: Sep. 24, 1999

(51) Int. Cl.$^7$ .............................. C03C 27/00; F06B 3/24
(52) U.S. Cl. .......................................... 156/109; 65/114
(58) Field of Search .............................. 65/69, 95, 114; 156/107, 109; 428/410, 34

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |

(List continued on next page.)

FOREIGN PATENT DOCUMENTS

| | | |
|---|---|---|
| DE | 2520062 | 11/1976 |
| DE | 2951330 | 7/1981 |
| EP | 0047725 | 12/1985 |
| EP | 0489042 | 6/1992 |
| EP | 0645516 | 3/1995 |
| EP | 0 831 073 A1 | 3/1998 |
| FR | 7424197 | 9/1973 |
| FR | 8012696 | 6/1980 |
| FR | 2 482 161 | 11/1981 |
| WO | 9700335 | 1/1997 |

OTHER PUBLICATIONS

PCT International Search Report dated Jan. 29, 2001.
"Temperature–Induced Stresses In Vacuum Glazing Modelling and Experimental Validation" by Simko, et. al., Solar Energy, vol. 63, No. 1, pp. 1–21, 1998.
"Fabrication of Evacuated Glazing at Low Temperature" by Griffiths, et. al., Solar Energy, vol. 63, No. 4, pp. 243–249, 1998.
"Thermal Outgassing of Vacuum Glazing" by Lenzen, et. al., School of Physics, The University of Sydney, NSW 2006, Australia.
"Current Status of the Science And Technology of Vacuum Glazing" by Collins, et. al, School of Physics, Univ. of Sydney, Sydney, NSW 2006, Australia.
Brochure for "Specialty Solders & Alloys, Technical Information" for Indium Corporation of America.
Product Data Sheet for Precision Spheres for BGAs (PGBA, CBGA, and TBGA), Indium Corporation of America.
Product Data Sheet for NC–SMQ® 80 Solder Paste, Indium Corporation of America.
Brochure for "Research Solder Kits", Indium Corporation of America.

Primary Examiner—Donald J. Loney
(74) Attorney, Agent, or Firm—Nixon & Vanderhye P.C.

(57) ABSTRACT

A vacuum insulating glass (IG) unit and method of making the same. At least a first edge seal portion is provided on at least one of two glass substrates prior to tempering. When the substrate(s) are thermally tempered, the high tempering temperatures achieved cause the first seal portion to diffuse into or bond to the substrate. Thereafter, after substantial cooling of the substrate(s) and during assembly of the vacuum IG unit, a secondary heating is performed to form a hermetic edge/peripheral seal using at least the first seal portion (additional seal material(s) may be applied in certain embodiments before the secondary heating step).

5 Claims, 9 Drawing Sheets

U.S. PATENT DOCUMENTS

| | | |
|---|---|---|
| 3,441,924 A | 4/1969 | Peek et al. |
| 3,742,600 A | 7/1973 | Lowell |
| 3,857,161 A | 12/1974 | Hutchins, IV |
| 3,902,883 A | 9/1975 | Bayer |
| 3,912,365 A | 10/1975 | Lowell |
| 3,936,553 A | 2/1976 | Rowe |
| 3,959,577 A | 5/1976 | Frink |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,393,105 A | 7/1983 | Kreisman |
| 4,422,280 A | 12/1983 | Mertin et al. |
| 4,486,482 A | 12/1984 | Kobayashi et al. |
| 4,514,450 A | 4/1985 | Nowobilski et al. |
| 4,542,611 A | 9/1985 | Day |
| 4,586,289 A | 5/1986 | Jaeger |
| 4,598,520 A | 7/1986 | Ellstrom |
| RE32,272 E | 10/1986 | Funaki et al. |
| 4,681,616 A | 7/1987 | McMaster |
| 4,683,154 A | 7/1987 | Benson et al. |
| 4,780,164 A | 10/1988 | Rueckheim et al. |
| 4,786,344 A | 11/1988 | Beutheil |
| 4,822,649 A | 4/1989 | Canaud et al. |
| 4,824,215 A | 4/1989 | Joseph et al. |
| 4,853,264 A | 8/1989 | Vincent et al. |
| 4,865,672 A | 9/1989 | Delbeck et al. |
| 4,874,461 A | 10/1989 | Sato et al. |
| 4,886,095 A | 12/1989 | Lisec |
| 4,888,038 A | 12/1989 | Herrington et al. |
| 4,909,874 A | 3/1990 | Rueckheim |
| 4,909,875 A | 3/1990 | Canaud et al. |
| 4,924,243 A | 5/1990 | Sato et al. |
| 4,928,448 A | 5/1990 | Phillip |
| 4,983,429 A | 1/1991 | Takayanagi et al. |
| 5,017,252 A | 5/1991 | Aldrich et al. |
| 5,027,574 A | 7/1991 | Phillip |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,270,084 A | 12/1993 | Parker |
| 5,271,973 A | 12/1993 | Huether |
| 5,313,761 A | 5/1994 | Leopold |
| 5,315,797 A | 5/1994 | Glover et al. |
| 5,366,574 A | 11/1994 | Lenhardt et al. |
| 5,399,406 A | 3/1995 | Matsuo et al. |
| 5,489,321 A | 2/1996 | Tracy et al. |
| 5,494,715 A | 2/1996 | Glover |
| 5,499,128 A | 3/1996 | Hasegawa et al. |
| 5,596,981 A | 1/1997 | Soucy |
| 5,643,644 A | 7/1997 | Demars |
| 5,657,607 A | 8/1997 | Collins et al. |
| 5,664,395 A | 9/1997 | Collins et al. |
| 5,739,882 A | 4/1998 | Shimizu et al. |
| 5,755,845 A | 5/1998 | Woodward et al. |
| 5,855,638 A | 1/1999 | Demars |
| 5,891,536 A | 4/1999 | Collins et al. |
| 5,897,927 A | 4/1999 | Tsai et al. |
| 5,902,652 A | 5/1999 | Collins et al. |
| 6,049,370 A | 4/2000 | Smith, Jr. et al. |

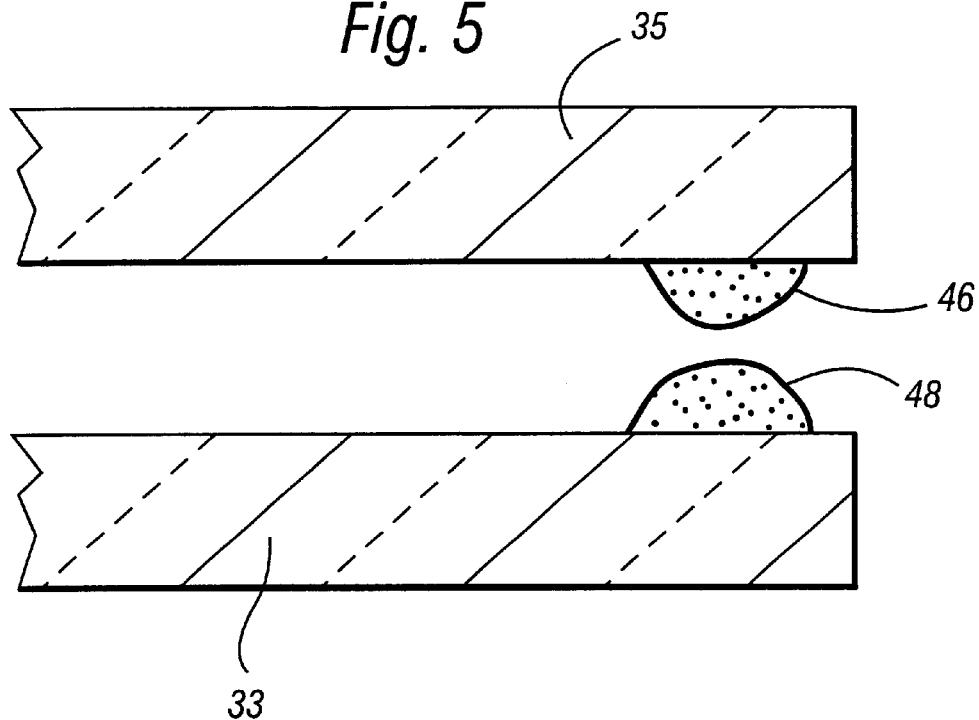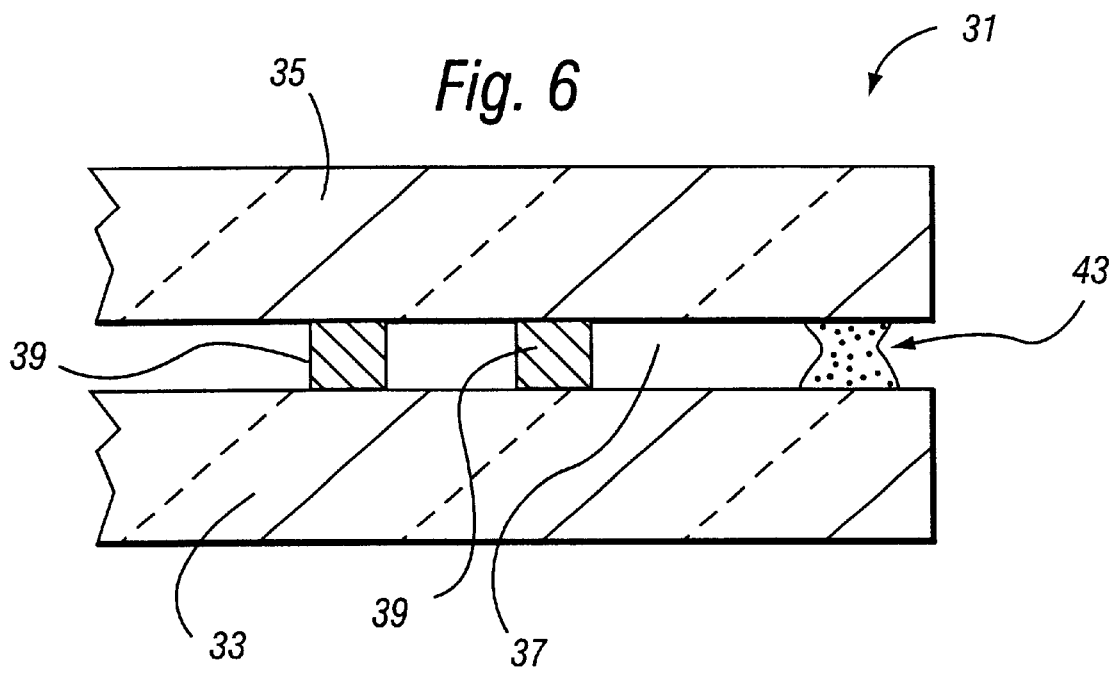

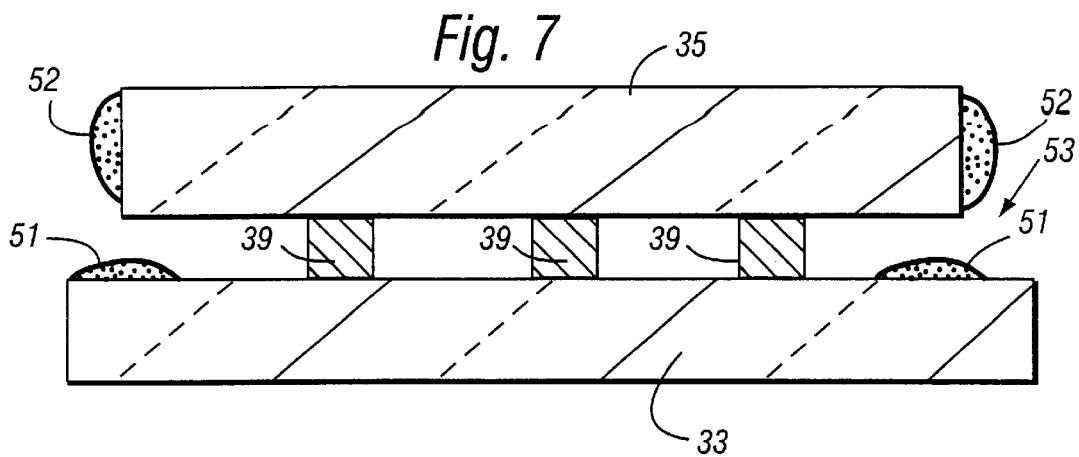
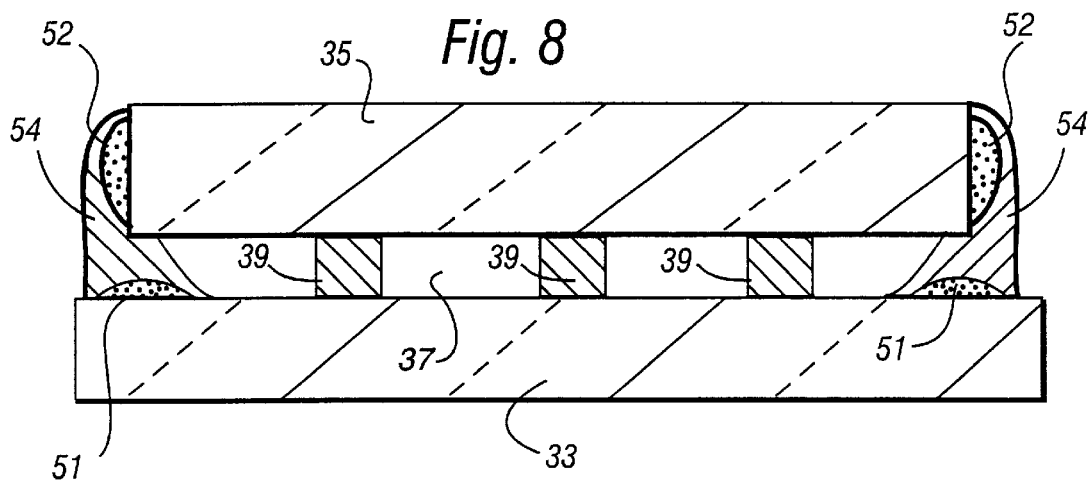
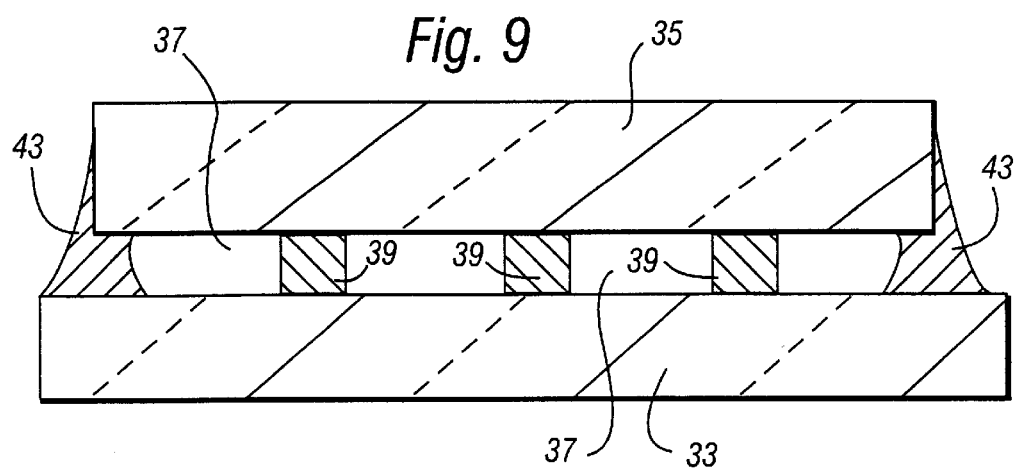

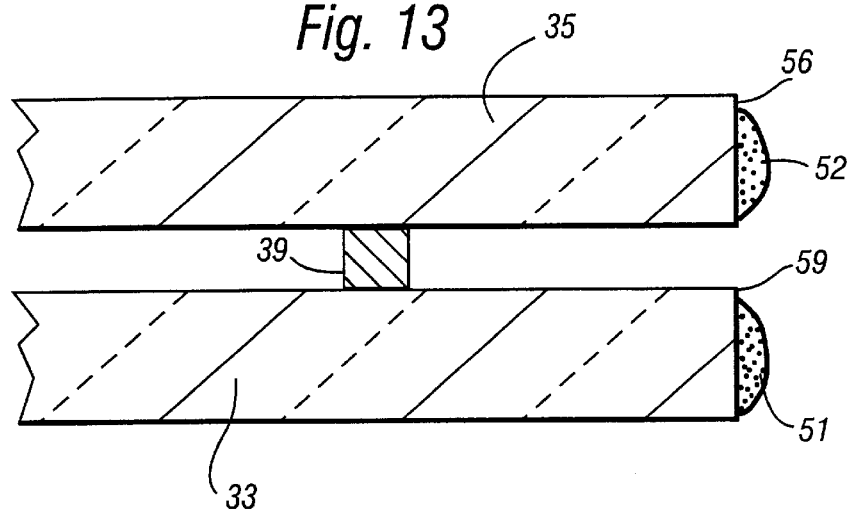
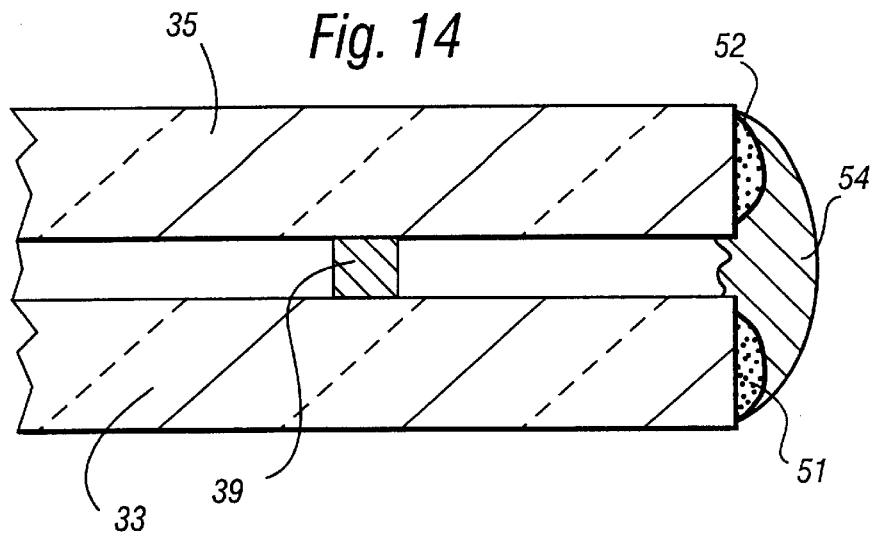
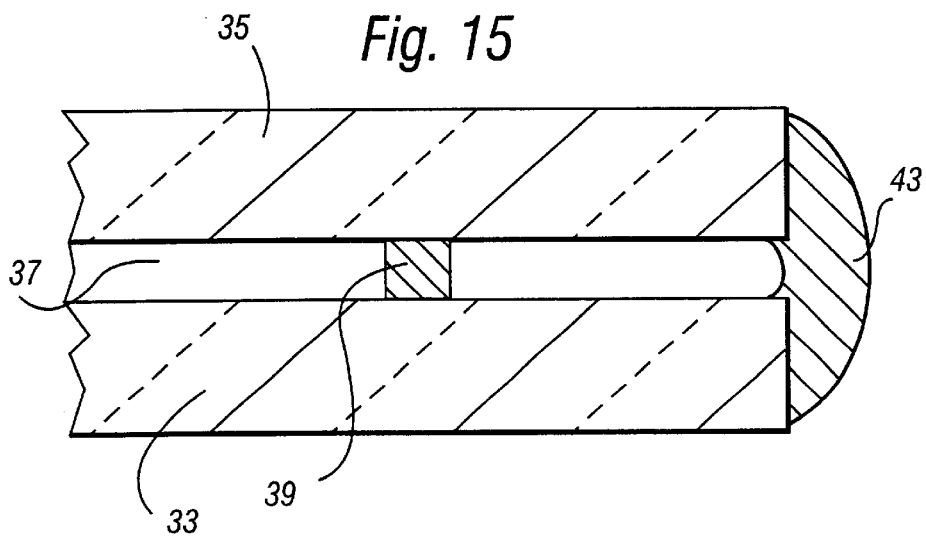

VACUUM IG WINDOW UNIT WITH PERIPHERAL SEAL AT LEAST PARTIALLY DIFFUSED AT TEMPER

RELATED APPLICATIONS

Commonly owned U.S. Ser. No. 09/303,550 entitled "VACUUM IG PILLAR WITH DLC COATING" filed May 3, 1999 pending, and Ser. No. 09/348,281 entitled "PERIPHERAL SEAL FOR VACUUM IG WINDOW UNIT" filed Jul. 7, 1999 pending, are both hereby incorporated herein by reference.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space therebetween. Glass sheets 2 and 3 are interconnected by peripheral or edge seal of fused solder 4 and an array of support pillars 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between sheets 2 and 3 can be evacuated to create a low pressure area. After evacuation, tube 8 is melted to seal the vacuum. Recess 11 retains melted and sealed tube 8. Chemical getter 12 may optionally be included within machined recess 13.

Conventional vacuum IG units, with their fused solder glass peripheral seals 4, have been manufactured as follows when the upper glass sheet is slightly smaller in dimension than the lower sheet. Solder glass is initially deposited around the periphery of the IG unit in an L-shaped step or corner that is formed by virtue of the upper sheet being slightly smaller in dimension than the lower sheet (not shown in FIGS. 1–2). The entire assembly including sheets 2, 3 and the solder glass seal material is then heated to a temperature of approximately 500° C. at which the solder glass melts, wets the surfaces of the glass sheets, and flows into the space between the sheets forming hermetic peripheral seal 4. This approximate 500° C. temperature is maintained for from about one to eight hours (it has recently been found that a time of about eight hours at approximately this temperature is preferred to properly bond solder glass seal material to the glass substrate(s)). After formation of peripheral/edge seal 4 and of the seal around pump out tube 8, the assembly is cooled to room temperature.

Unfortunately, these 500° C. temperatures and multi-hour periods over which such temperatures are maintained in forming edge seal 4 are undesirable, especially when it is desired to use a tempered glass sheet in the IG unit. Tempered glass loses temper strength upon exposure to high temperatures as a function of heating time as shown in FIGS. 3–4. Moreover, high temperatures may have an adverse effect upon certain low-E coating(s) that may be applied to one or both of the glass sheets.

FIG. 3 is a graph illustrating how fully thermally tempered plate glass loses original temper upon exposure to different temperatures for different periods of time, where the original center tension stress is 3,200 MU per inch. The X-axis in FIG. 3 is exponentially representative of time in hours (from 1 to 1,000 hours), while the Y-axis is indicative of the percentage (%) of original tempering strength remaining after exposure. FIG. 4 is a graph similar to FIG. 3, except that the X-axis extends from 0 to 1 hour exponentially.

Seven different curves are illustrated in FIG. 3, each indicative of a different temperature exposure in degrees Fahrenheit (F). The different temperature curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal/joint 4. Thus, attention is drawn to the 900° F. curve in FIG. 3, labeled by reference numeral 18. As shown, only 20% of the original temper remains after one hour at this temperature (900° F. or 482° C.). Such a loss of temper strength may result in certain window units not being able to pass safety codes set for environments where tempered glass is desirable.

Still referring to FIGS. 3–4, it is noted that much better temper strength remains in a thermally tempered glass sheet when it is heated to a temperature of 800° F. (i.e. about 428° C.) for one hour (as opposed to 900° F. for one hour). Such a glass sheet retains about 70% of its original temper strength after one hour at 800° F., which is significantly better than the less than 20% when at 900° F. for the same period of time.

It is apparent from the above that there exists a need in the art for a vacuum IG unit, and corresponding method of making the same, where a hermetic seal may be provided between opposing glass sheets without thermally tempered glass sheet(s) of the unit losing more than about 50% of their original temper strength. There also exists a need in the art for a vacuum IG unit including tempered glass sheets, wherein the peripheral seal is formed such that the glass sheets retain more of their original temper strength than with conventional vacuum IG manufacturing techniques. There also exists a need in the art to decrease post-tempering processing time, and to reduce the approximate 8 hour period which is now believed to be necessary to properly cause edge seal solder glass material to diffuse into or bond to glass substrate(s). It is a purpose of this invention to fulfill any and/or all of the above listed needs in the art.

This invention will now be described with respect to certain embodiments thereof, accompanied by certain illustrations.

SUMMARY OF THE INVENTION

An object of this invention is to provide a vacuum IG unit having a peripheral or edge seal, wherein the peripheral/edge seal is formed so that thermally tempered glass sheets of the unit retain more of their original temper strength than if conventional seal forming techniques were used with the same seal material.

Another object of this invention is to provide a vacuum IG unit (and method of making the same), wherein the resulting thermally tempered glass sheet(s) retain at least about 50% of their original temper strength after formation of the unit.

An object of this invention is to provide an edge seal for a vacuum IG unit, wherein the edge seal does not require processing temperatures greater than about 450° C. other than during tempering.

Yet another object of this invention is to, in the manufacture of a vacuum IG unit, provide or deposit at least an initial portion of the edge seal on one or both of the glass substrates prior to temper, and thereafter use the heat in the tempering furnace/oven to cause the initial edge seal portion to diffuse into or bond to the glass during tempering. In certain embodiments, this permits lower processing temperatures to be used thereafter to form the peripheral/edge seal because higher temperatures are typically needed to cause solder glass seal material to diffuse into or bond to glass substrate(s) than are needed to cause such material to bond to another piece of the same material.

Another object of this invention is to reduce the amount of post-tempering heating time necessary to form a peripheral/edge seal in a vacuum IG unit.

Another object of this invention is to reduce post-tempering maximum temperatures needed to form a peripheral/edge seal in a vacuum IG unit.

Another object of this invention is to fulfill any and/or all of the above-listed objects.

Generally speaking, this invention fulfills any or all of the above described needs by providing a method of making a window unit comprising the steps of:

providing first and second glass substrates;
providing a first seal material portion on at least one of the substrates;
thermally tempering the at least one substrate with the first seal material portion thereon;
following said tempering step, providing a plurality of spacers between the first and second substrates;
heating the first seal material portion to a seal forming temperature less than a maximum temperature achieved during said tempering step in forming a seal that defines a sealed space between the substrates; and
causing the sealed space to be at a pressure less than atmospheric pressure.

This invention further fulfills any or all of the above described needs by providing a method of making a window unit comprising the steps of:

providing first and second glass substrates;
providing a first seal material portion on at least one of the substrates;
thermally tempering the at least one substrate with the first seal material portion thereon, said tempering step including heating the at least one substrate to a temperature of at least about 535° C.;
following said tempering step, providing at least one spacer between the first and second substrates; and
heating the first seal material portion to a seal forming temperature of less than about 450 degrees C in a post-tempering heating step in forming a seal that defines a sealed space between the substrates.

This invention still further fulfills any or all of the above described needs in the art by providing an insulating glass (IG) window unit comprising:

first and second glass substrates spaced from one another so as to define a low pressure space therebetween, said low pressure space having a pressure less than atmospheric pressure; and
a hermetic seal disposed between said substrates sealing said low pressure space from surrounding atmosphere so as to maintain pressure less than atmospheric pressure in said space, and wherein at least a portion of said hermetic seal bonds to one of said substrates during thermal tempering of said one of said glass substrates.

IN THE DRAWINGS

FIG. 5 is a side cross sectional view of a pair of glass substrates after thermal tempering according to an embodiment of this invention, wherein initial peripheral seal material was applied to each substrate prior to tempering so that the heat utilized during tempering caused the initial seal material to diffuse into or bond to the respective glass substrate(s).

FIG. 6 is a side cross sectional view of part of a vacuum IG window unit made by sandwiching an array of pillars/spacers between the FIG. 5 substrates and heating the unit while pressing the substrates toward one another so that the opposing heat-softened seal lumps or masses are pressed together to form the peripheral/edge seal.

FIG. 7 is a side cross sectional view, according to another embodiment of this invention, of a vacuum IG unit after tempering but before an additional portion of peripheral/edge seal material has been provided thereon.

FIG. 8 is a side cross sectional view of the FIG. 7 vacuum IG unit after the additional portion of peripheral/edge seal material has been provided thereon but before secondary heating.

FIG. 9 is a side cross sectional view of a vacuum IG unit according to the FIGS. 7–8 embodiment after the peripheral/edge seal has been formed.

FIG. 13 is a side cross sectional view, according to yet another embodiment, of a vacuum IG unit after tempering but before an additional portion of peripheral/edge seal material has been provided thereon.

FIG. 14 is a side cross sectional view of the FIG. 13 vacuum IG unit after the additional portion of peripheral/edge seal material has been provided thereon but before secondary heating.

FIG. 15 is a side cross sectional view of a vacuum IG unit according to the FIGS. 13–14 embodiment after the peripheral/edge seal has been formed.

DETAILED DESCRIPTION OF CERTAIN EMBODIMENTS OF THIS INVENTION

Figure 2:
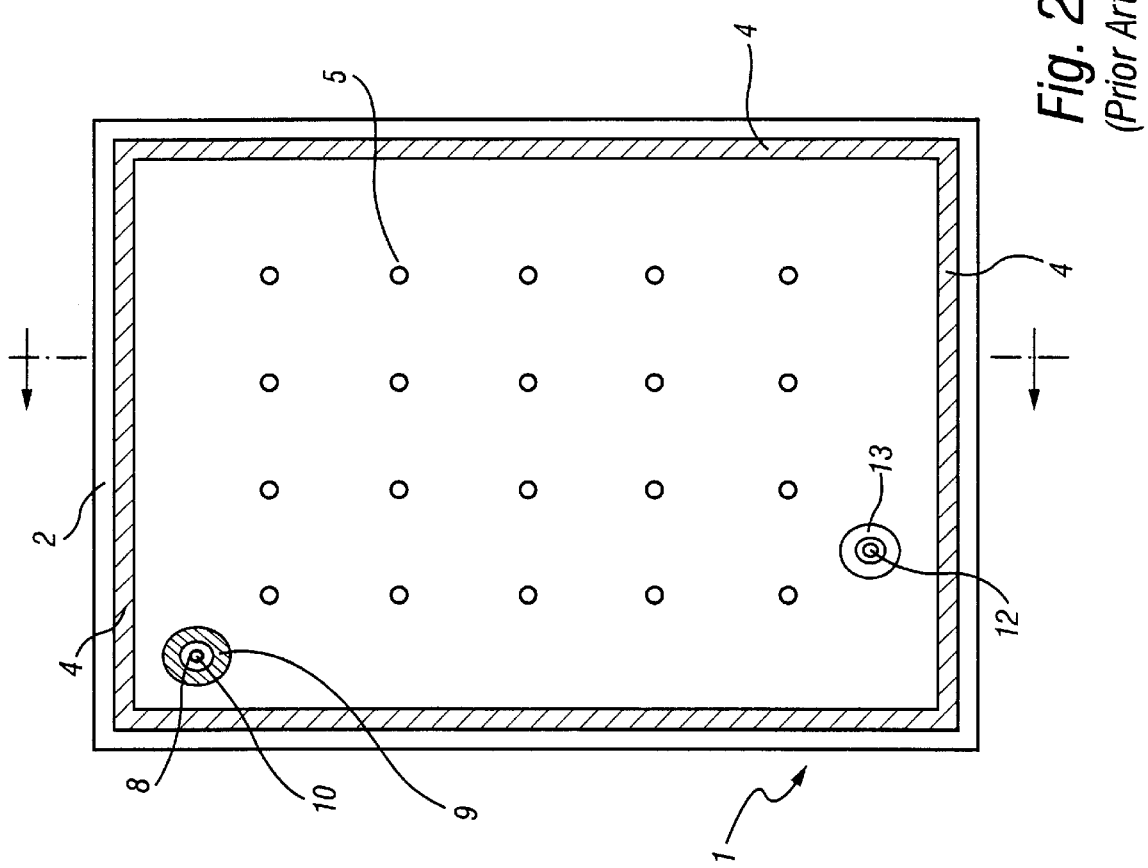
FIG. 2 is a prior art top plan view of the FIG. 1 vacuum IG unit, taken along the section line illustrated in FIG. 1.
Figure 1:
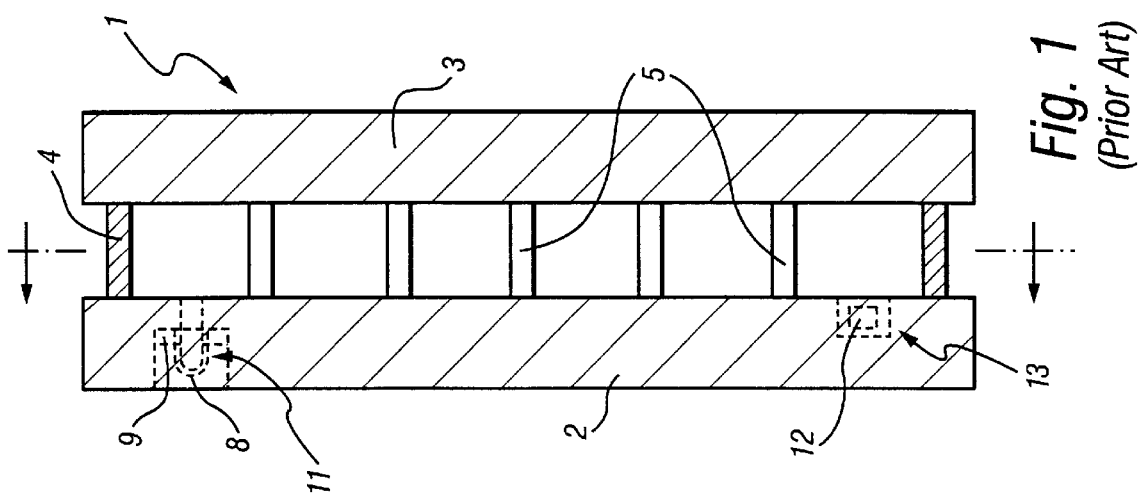
FIG. 1 is a prior art cross-sectional view of a conventional vacuum IG unit.
Figure 3:
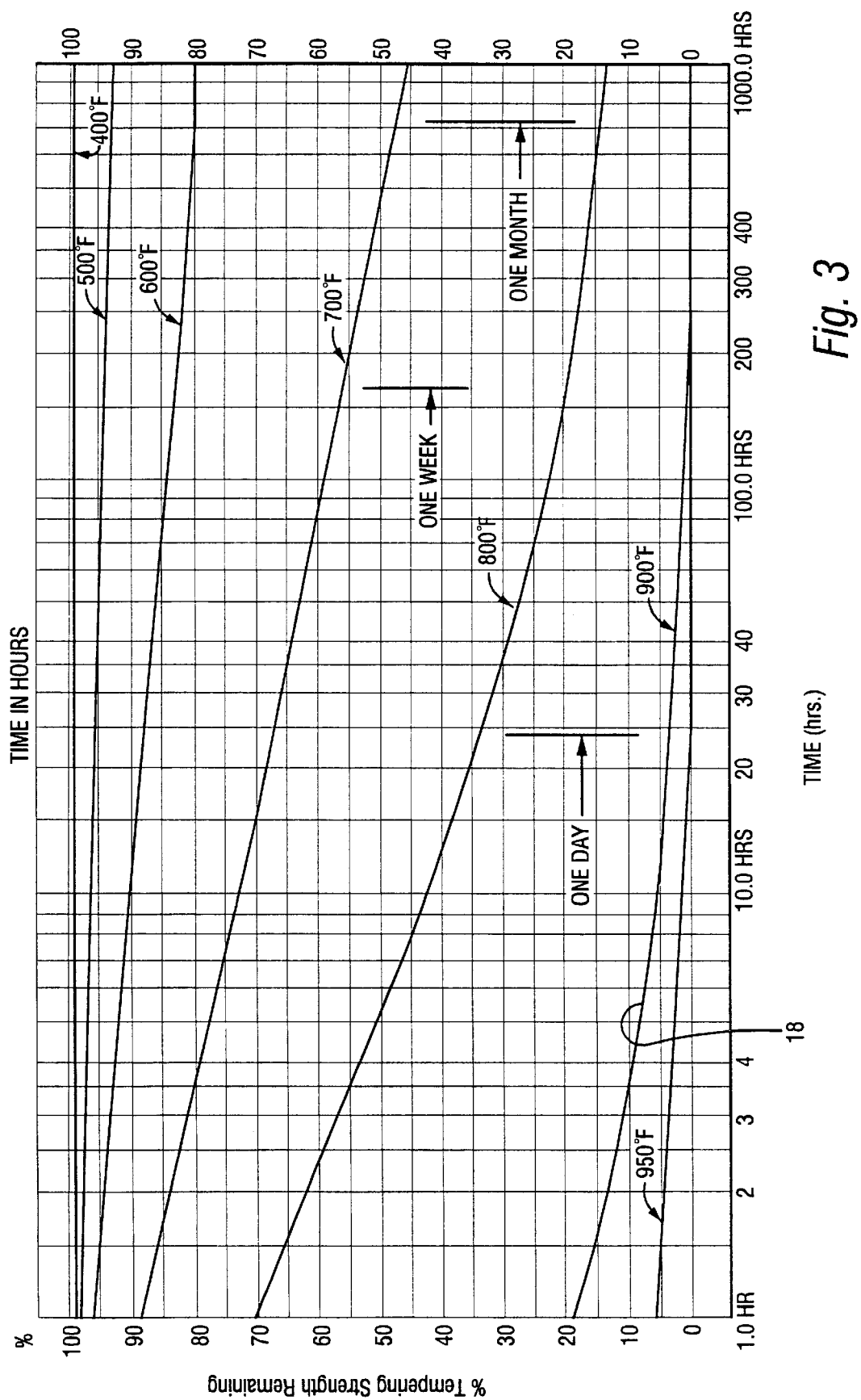
FIG. 3 is a graph correlating known time (hours) vs. percent tempering strength remaining, illustrating the loss of original temper strength for a thermally tempered sheet of glass after exposure to different temperatures for different periods of time.
Figure 4:
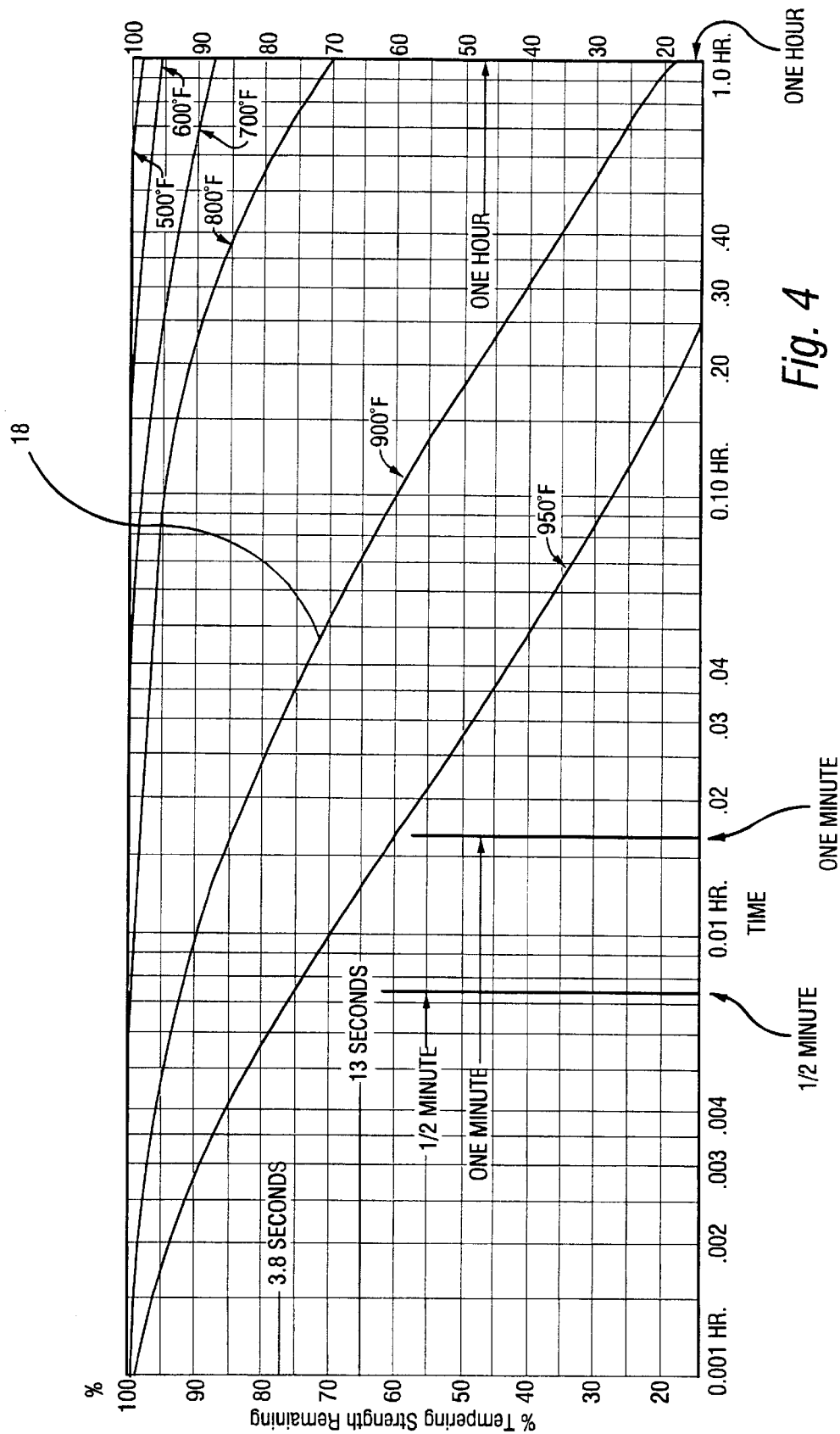
FIG. 4 is graph correleating a known time vs. percent tempering strength remaining.

Referring now more particularly to the accompanying drawings in which like reference numerals indicate like parts throughout the several views.

Certain embodiments of this invention relate to an improved peripheral or edge (i.e. peripheral/edge) seal in a vacuum IG window unit, and/or a method of making the same. "Peripheral" and "edge" seals herein do not mean that the seals are located at the absolute periphery of the unit, but instead mean that the seal is at least partially located at or near (e.g. within about two inches) an edge of at least one substrate of the unit.

FIG. 6 is a cross sectional view of thermally insulating glass panel 31 according to an embodiment of this invention. Because interior space 37 between the opposing substrates is at a pressure lower than atmospheric in general, this type of panel is often referred to as a vacuum insulating glass (IG) unit.

Vacuum IG unit or panel 31 includes first glass substrate 33, second glass substrate 35, low pressure or evacuated space 37 between substrates 33 and 35, spacers/pillars 39 for spacing the substrates 33, 35 from one another and supporting them, optional pump out tube (not shown) disposed in a hole or aperture formed in substrate 33 for evacuating space 37, and peripheral or edge seal 43 that hermetically seals low pressure space 37 between substrates 33, 35. Hermetic edge seal 43 prevents air from entering space 37 and keeps the vacuum therein. Seal 43 in certain embodiments may be located in approximately the same location as edge seal 4 shown in FIG. 2.

Vacuum IG units 31 according to different embodiments of this invention may be used as residential or commercial windows. The evacuation of space 37 eliminates or reduces heat transport between glass substrates 33 and 35 due to gaseous conduction and convection. In addition, radiative heat transport between glass sheets 33 and 35 can be reduced to a low level by providing a low emittance (low-E) coating (s) on the internal surface of one or both of sheets 33, 35. High levels of thermal insulation can thus be achieved. Low gaseous thermal conduction may be achieved when the pressure in space 37 is reduced to a level below about $10^{-2}$ Torr, more preferably below about 1.0 mTorr, or $10^{-3}$ Torr, and most preferably below about $10^{-6}$ Torr of atmospheric pressure. To maintain such low pressures, the internal surfaces of glass substrates 33 and 35 may be outgassed, and areas at or near the edges or peripheries of substrates 33, 35 are hermetically sealed together by seal 43 that eliminates any ingress of gas or air.

Still referring to FIG. 6, an array of small, high strength support pillars 39 is provided between substrates 33 and 35 in order to maintain separation of the two approximately parallel glass sheets against atmospheric pressure. It is often desirable for pillars 39 to be sufficiently small so that they are visibly unobtrusive. In certain embodiments, each pillar may have a height of from about 0.10 to 0.30 mm. Pillars may be made of solder glass, ceramic, or metal in different embodiments of this invention.

Tempered glass 33 and/or 35 is valued for its mechanical and thermal strength. Tempered glass has been used traditionally in commercial applications where wind, snow or thermal loads exceed the strength capabilities of other glass and/or where tempered glass is mandated by code (e.g. safety glazing for entranceways, railings, or fire knockout windows). In certain preferred embodiments of this invention, glass sheets 33 and 35 are thermally or heat tempered. By providing tempered glass sheets as substrates 33 and 35, the strength of the glass sheets is increased. This allows pillars to be spaced further apart, which increases stresses at the glass/pillar interface(s) but potentially results in less pillars being utilized in the vacuum IG unit. Reduction in the number of pillars may enhance the thermal insulation properties of vacuum IG unit 31. In preferred embodiments of this invention, the glass sheets are thermally tempered prior to the step of sandwiching the pillars therebetweeen.

According to certain embodiments of this invention, the glass used for substrates 33 and 35 is soda lime silica glass, comprising by weight 70–74% silicon oxide, 12–16% by weight sodium oxide, 7–12% lime (CaO), 0–5% MgO, 0–5% alumina, and 0–0.20% iron oxide. However, other types of glass, colored or clear, may also be used (e.g. borosilicate glass). Glass sheets 33 and/or 35 may be from about 1 to 4.5 mm thick each, preferably from about 2–3 mm thick each. However, when tempered, thinner glass sheets 33, 35 may be used (e.g. from about 1 to 3 mm thick, more preferably from about 1.7 to 2.3 mm thick). The use of thinner glass substrates 33, 35 may provide for improved thermal behavior (e.g. reduced edge conduction).

In the FIGS. 5–6 embodiment, wet (or liquid) peripheral/ edge seal material 46, 48 in slurry form is deposited or provided on each substrate 33, 35 prior to tempering in the locations shown in FIG. 5 (although FIG. 5 shows seal portions 46, 48 after tempering). Initial slurry portions 46, 48 are provided on what is to be the interior major surfaces of the respective glass substrates 33, 35, so that seal portions 46, 48 can later be approximately aligned with one another when substrates 33, 35 sandwich spacers/pillars 39 therebetween during the assembly process. In certain embodiments, material 46, 48 when first applied on the substrates is a wet slurry of solder glass powder (e.g. Powder Material Model 7555 solder glass obtained from Electro-Glass, Mammoth, Pa. mixed in solvent (e.g. Model F1016AJ04 frit lacquer solvent obtained from Pierre & Stevens Corp., Buffalo, N.Y.).

Glass substrates 33 and/or 35 with initial seal slurry portions 46, 48 thereon are then tempered in a furnace(s) which heats the products to an approximately uniform temperature of about 1200° F. (e.g. from about 1000° to 1500° F., preferably from about 1100° to 1400° F.) for a period of from about 2–5 minutes (depeding upon the type and/or thickness of any coating(s) on the substrate). Thus, during tempering, the glass is heated to a maximum temperature of at least about 535° C. (i.e. 1,000° F.). This heating during glass temper causes initial solder glass seal material 46, 48 to diffuse into or bond to the respective glass substrate upon which the material is located. The slurry solvent of initial portions 46, 48 is typically a volatile or semi-volatile component which evaporates during the drying of the sealing material slurry during temper. Solder glass seal portions or masses 46 and 48 shown in FIG. 5 are left following tempering.

When glass with initial seal portion 46, 48 thereon exits the tempering furnace, it is rapidly cooled by a series of air nozzles. This rapid cooling puts approximately 20% of the glass surface of each substrate into a state of compression, with the center core in tension. Tempered glass gains strength from the compressed surfaces. If the surface is penetrated by a scratch or an impact, the glass may break into a number of small particles. In certain embodiments of this invention, when substrates 33 and/or 35 are heat tempered, they may have up to approximately four times the mechanical and/or thermal strength of annealed glass of equal thickness. Break patterns of tempered glass herein are typically governed by and comply with Consumers Product Safety Commission 16 CFR 1202 and ANSI Z-97.1, both incorporated herein by reference.

Thus, following tempering, each substrate 33, 35 includes a portion (e.g. hump or mass as shown in FIG. 5) 46, 48 of seal material thereon that is bonded to the underlying substrate. The two FIG. 5 substrates are then brought together to sandwich spacers/pillars 39 therebetween and initial seal portions 46 and 48 on the opposing substrates are approximately aligned with and contact one another. The substrates and contacting seal portions 46, 48 are then heated so sealing portions 46 and 48 at least partially soften. This post-temper or secondary heating of the substrates may be from a temperature of from about 300° to 440° C. (more preferably from about 375° to 420° C., and most preferably from about 400° to 415° C.) for a period of time of less than about two hours (preferably from about 0.5 to 60 minutes, more preferably from about 10 to 40 minutes, and most preferably from about 20 to 30 minutes).

This secondary heating is preferably to a maximum temperature that is substantially less than the maximum tempering temperature and which causes solder glass seal portions 46, 48 to at least partially soften, but not completely melt. Because the secondary heating is preferably to a temperature less than about 450° C., tempered glass substrates 33, 35 retain at least about 50% of their original temper strength (more preferably at least about 60%, and most preferably at least about 70%) after this post-temper or secondary heating process is completed.

Still referring to FIGS. 5–6, as seal portions 46 and 48 soften while contacting one another when post-temper heated, the opposing substrates 33 and 35 are pressed together to cause portions 46 and 48 to mesh or mold together to form single continuous hermetic peripheral/edge seal 43 as shown in FIG. 6. In certain embodiments, one or both of substrates 33, 35 may be pressed against the other during the heating and deformation of the initial sealing portions. During or after this secondary heating step and pressing together of the substrate(s) to form seal 43, space 37 may be evacuated in any conventional method (e.g. using a pump-out tube, or assembling the product in a vacuum chamber), with the resulting vacuum IG unit 31 being shown in FIG. 6.

Preferably, in the FIGS. 5–6 embodiment, no additional seal material is dispensed onto either substrate after tempering. Initial portions 46, 48 contain all seal material needed to form seal 43 after reformation of portions 46, 48 during the post-temper heating step. However, in alternative embodiments of this invention, initial portions 46, 48 may be dispensed onto the substrates pre-temper and additional seal material (e.g. solder glass slurry) may be dispensed or deposited on the substrate(s) 33, 35 in the edge seal area prior to the post-temper heating step where seal 43 is formed.

It is noted that in the FIGS. 5–6 embodiment glass substrates 33, 35 are approximately the same size. However, in alternative embodiments, substrates 33, 35 may be differently sized to define an L-shaped step proximate an edge of the unit. Moreover, while seal 43 is preferably of or includes fused solder glass, the seal may be formed of or include other materials in alternative embodiments of this invention (e.g. gold, platinum, silver, indium, and/or combinations thereof).

The diffusion or bonding of solder material (e.g. 46, 48) into glass (e.g. 33, 35) requires a much higher temperature than diffusion or bonding of solder material into another piece of solder material. By using the tempering furnace/oven to both temper glass substrates 33, 35 and simultaneously cause this diffusion to occur, at least any of the following advantages may be realized: (i) process step(s) and/or cycle time(s) are reduced; (ii) a lower temperature than would otherwise be required may be used post-temper to form seal 43 thereby enabling substrates 33, 35 to retain more of their original temper strength than would otherwise have been possible using conventional methods; and/or (iii) shorter post-temper heating cycle time may be used to form seal 43.

FIGS. 7–9 illustrate another embodiment of this invention, where first or initial portions 51, 52 of edge seal material (e.g. solder glass in slurry form) are provided on the substrates pre-temper and additional portion 54 of edge seal material is provided on the initial portions post-tempering. The high temperatures achieved during tempering (described above regarding the FIGS. 5–6 embodiment) of the substrates causes at least part of the solder glass 51 and 52 to diffuse into or bond to the substrates. Thereafter, the substrates are oriented to sandwich pillars/spacers 39 therebetween as shown in FIG. 7. Then, additional portion 54 of peripheral/edge seal material is dispensed or deposited (e.g. solder glass in slurry form as described above) onto the unit proximate the edge thereof so as to contact bonded portions 51, 52 as shown in FIG. 8. Additional portion 54 is provided around the entire periphery of the unit in approximately L-shaped step area 53. The FIG. 8 unit is then heated to post-temper or secondary temperatures less than about 450° C. as described above so that seal portion 54 at least partially softens and diffuses into or bonds to initial seal portions 51 and 52 thereby forming hermetic seal 43. The final vacuum IG unit is shown in FIG. 9.

Figure 10:
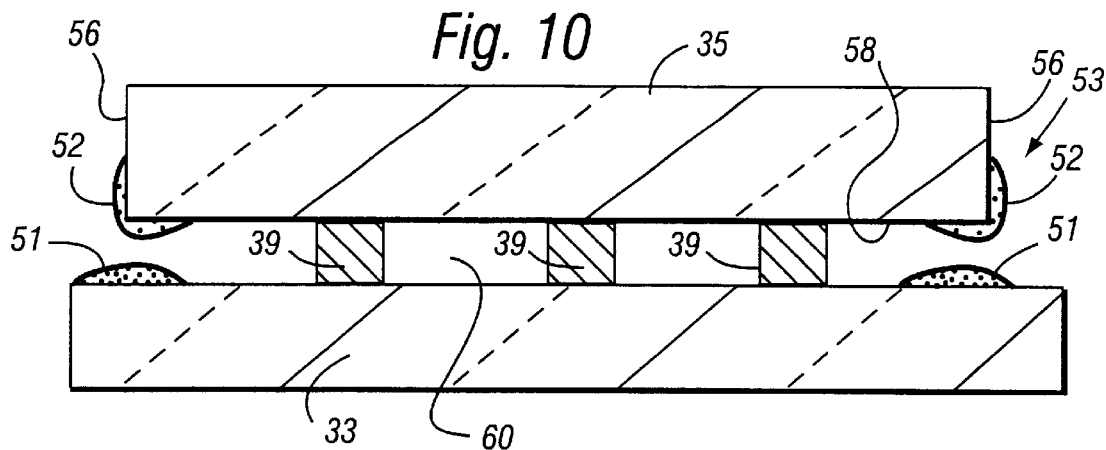
FIG. 10 is a side cross sectional view, according to another embodiment, of a vacuum IG unit after tempering but before an additional portion of peripheral/edge seal material has been provided thereon.
Figure 11:
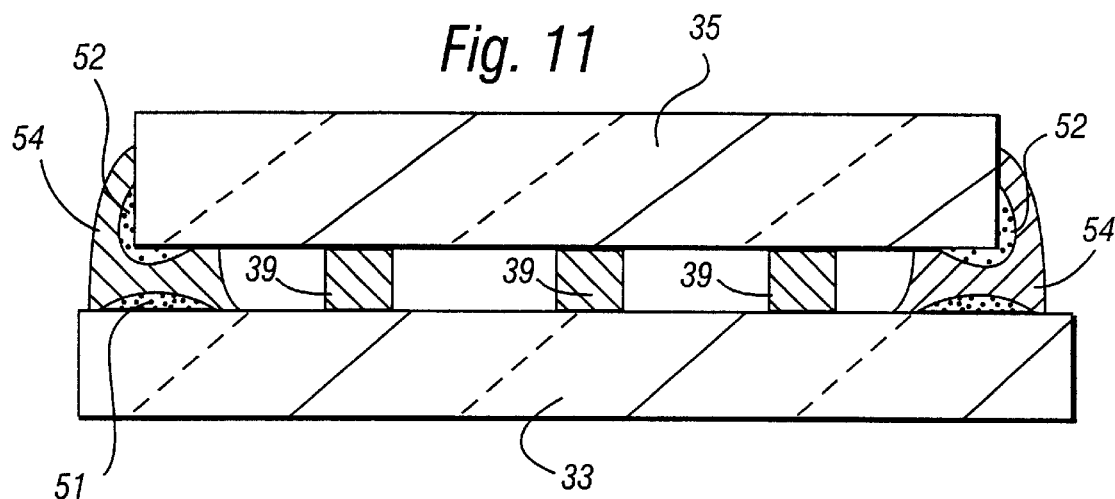
FIG. 11 is a side cross sectional view of the FIG. 10 vacuum IG unit after the additional portion of peripheral/edge seal material has been provided thereon but before secondary heating.
Figure 12:
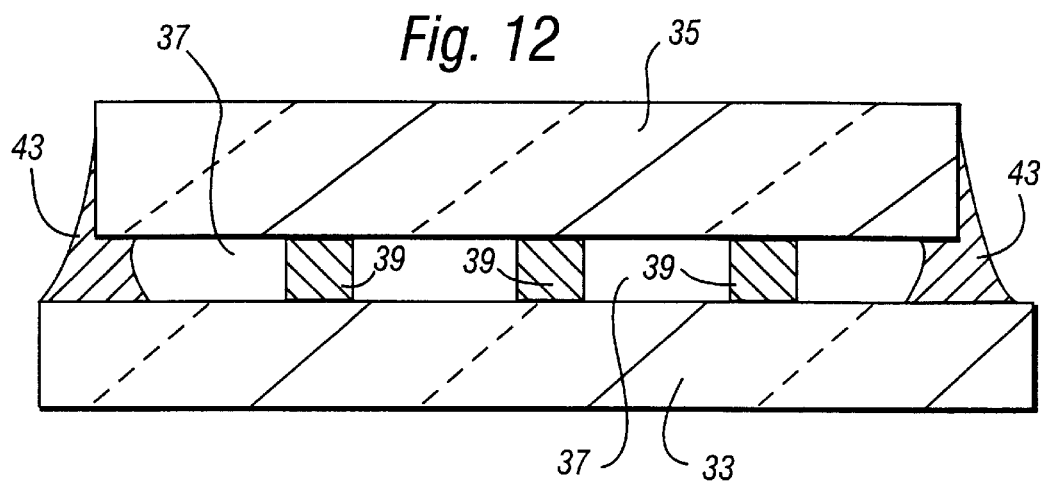
FIG. 12 is a side cross sectional view of a vacuum IG unit according to the FIGS. 10–11 embodiment after the peripheral/edge seal has been formed.

FIGS. 10–12 illustrate another embodiment of this invention that is the same as the FIGS. 7–9 embodiment except that initial seal portion 52 is dispensed and formed partly on edge 56 and partly on interior major surface 58 of substrate 35. Also, initial seal portion 51 is partially located in step area 53 and partially located in space 60 within the confines of the periphery of smallest glass substrate 35. As in the FIGS. 7–9 embodiment, initial seal portions 51, 52 in the FIGS. 10–12 embodiment are located in a manner so that additional seal portion 54 can diffuse thereinto and become bonded thereto when applied post-temper and exposed to secondary heat less than about 450° C.

FIGS. 13–15 illustrate another embodiment of this invention that is similar to the FIGS. 7–12 embodiments except that glass substrates 33 and 35 are approximately the same size and initial seal portions 51 and 52 are dispensed and located in slurry form on edges 56 and 59 of the respective substrates prior to tempering. After high temperatures achieved during tempering of the substrates cause seal portions 51 and 52 to diffuse into and bond to the respective substrates, the substrates are positioned to sandwich spacers/pillars 39 therebetween as shown in FIG. 13. Additional seal portion 54 (e.g. in wet slurry form) is then applied to contact portions 51 and 52 as shown in FIG. 14. Application of the post-temper secondary heat described above causes seal portion 54 to diffuse into and bond to seal portions 51 and 52 thereby forming hermetic edge/peripheral seal 43 interconnecting the substrates as shown in FIG. 15.

Figure 16:
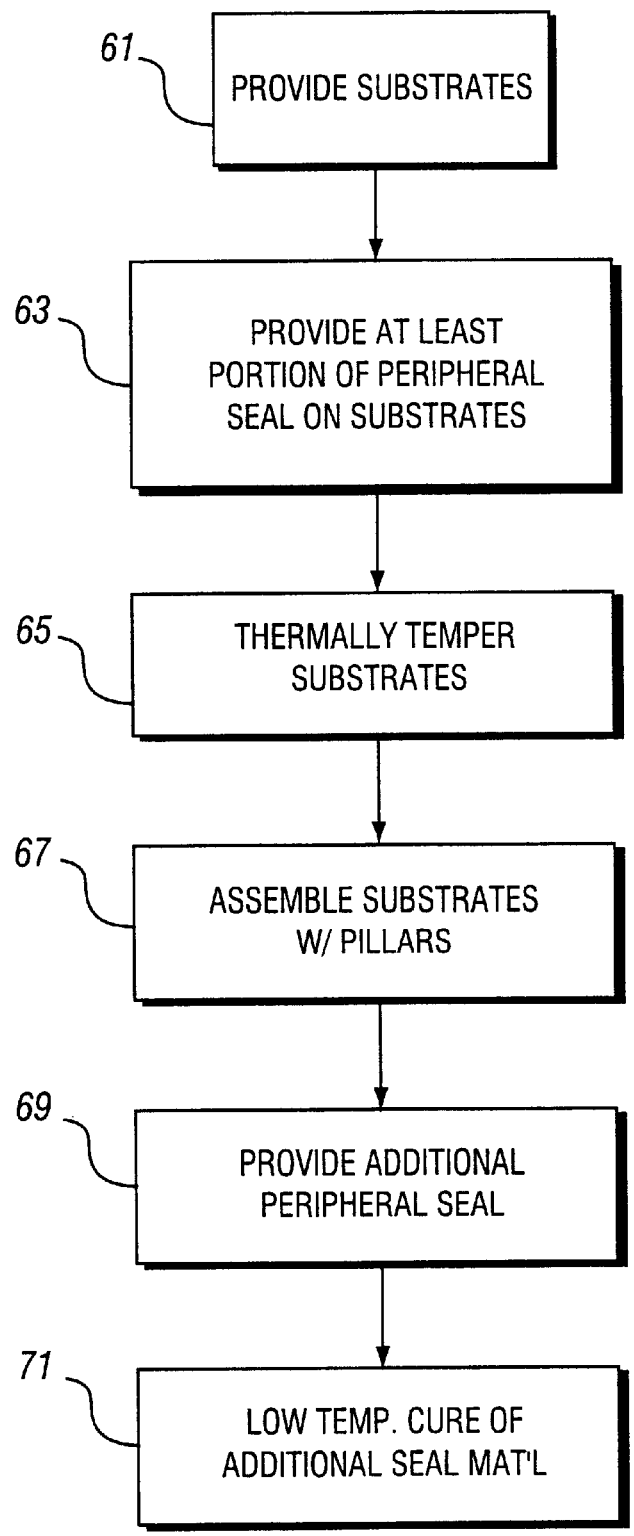
FIG. 16 is a flow chart illustrating certain steps performed according to any of the FIGS. 7–15 embodiments of this invention.

FIG. 16 is a flow chart of certain steps taken in accordance with any of the embodiments of FIGS. 7–15. This flow chart is not intended to be limiting, but is provided for purposes of example only. As illustrated, to begin with, non-tempered glass substrates 33, 35 are provided at step 61. Then, at step 63 initial portions of solder glass seal material 51, 52 are dispensed or provided (preferably in wet slurry form as described above, or possibly in wire or other dry form in alternative embodiments) proximate the edges of the respective substrates. Substrates 33, 35 with seal portions 51, 52 thereon are then forwarded either individually or together into a tempering furnace/oven and thermally tempered at step 65 at temperatures described above. At least parts of solder glass seal portions 51, 52 are caused to diffuse into and bond to the substrates by the high temperatures utilized during the glass tempering process.

Upon exiting the tempering furnace/oven, the substrates are manipulated during the unit assembly process to sandwich an array of spacers/pillars 39 therebetween at step 67. Additional edge/peripheral solder glass seal portion 54 may then be dispensed adjacent to and contacting portions 51, 52 at step 69 so as to enclose the space between the opposing glass substrates 33, 35. The unit is then exposed to secondary heating at step 71 as described above to cause seal portion 54 to diffuse into and/or bond to portions 51 and 52 in order to form hermetic edge/peripheral seal 43. is Following evacuation of the internal space, a vacuum IG unit results.

Figure 17:
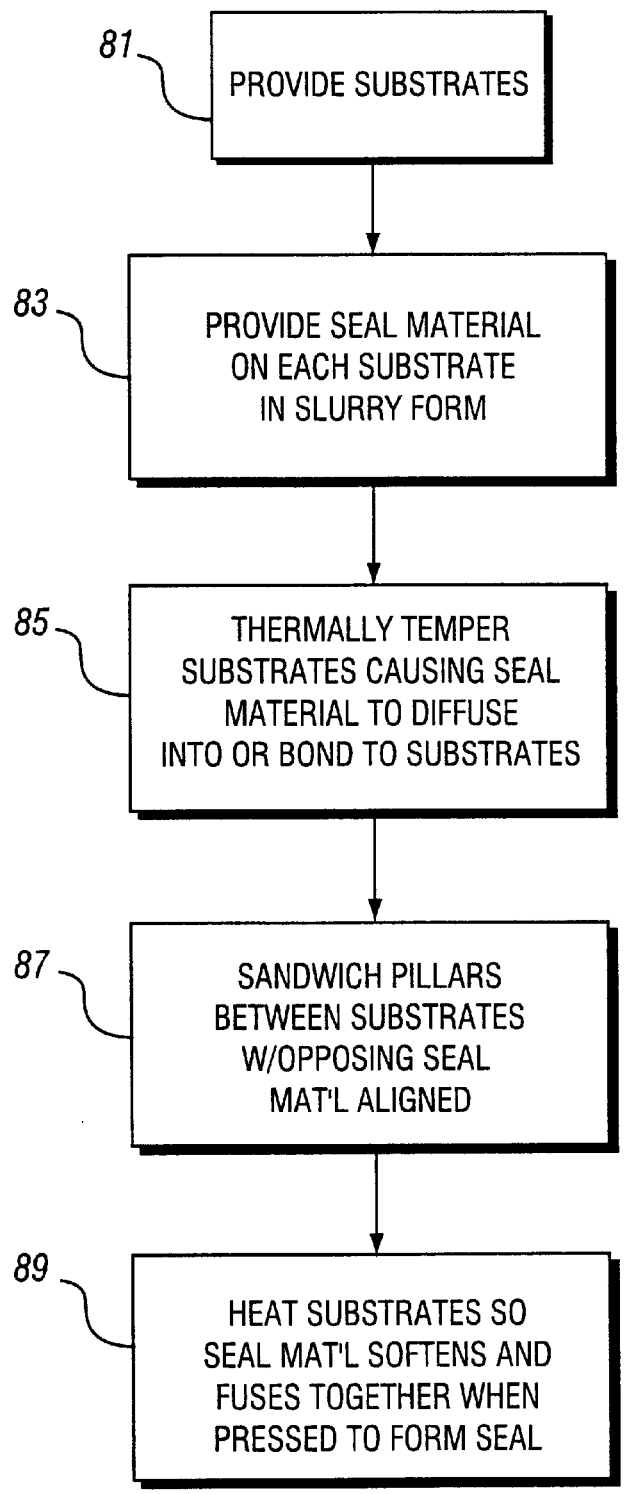
FIG. 17 is a flow chart illustrating certain steps performed according to the FIGS. 5–6 embodiment of this invention.

FIG. 17 is a flow chart of certain steps taken in accordance with the embodiment of FIGS. 5–6. This flow chart is not intended to be limiting, but instead is provided for purposes of example only. To begin with, non-tempered glass substrates 33, 35 are provided at step 81. Then, at step 83 initial portions of solder glass seal material 46, 48 are provided (preferably in wet slurry form as described above, or possibly in wire or other dry form in alternative embodiments) proximate the edges of the respective substrates. Substrates 33, 35 with seal portions 46, 48 thereon are then forwarded either individually or together into a tempering furnace/oven and thermally tempered at step 85. At least parts of solder glass seal portions 46, 48 are caused to diffuse into and bond to the substrates by the high temperatures utilized during the glass tempering process.

Upon exiting the tempering furnace/oven, the substrates are manipulated during the unit assembly process to sandwich an array of spacers/pillars 39 therebetween at step 67 so that opposing continuous seal portions 46 and 48 are approximately aligned with and contact one another. The alignment and contacting of seal masses or portions 46, 48 encloses the space between the opposing glass substrates 33, 35. The unit is then exposed to secondary heating less than about 450° C. at step 89 as described above while the substrates and heat-softened seal portions 46, 48 are pressed toward one another (both may be pressed toward one another simultaneously, or one may be pressed toward the other which is held stationary) to cause the opposing seal portions 46 and 48 to diffuse into and/or bond to one another in order to form hermetic edge/peripheral seal 43 as shown in FIG. 6. Thereafter, in certain embodiments a pump out tube may be used to evacuate sealed space 37 to a pressure less than atmospheric, so that the FIG. 6 vacuum IG unit results. Alternatively, the substrates may be sandwiched about the spacers 39 in a low pressure or vacuum chamber so that space 37 is at a pressure lower than atmospheric after seal 43 is formed.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of making a window unit comprising the steps of:

providing first and second glass substrates;

providing a first seal material portion on at least one of the substrates;

thermally tempering the at least one substrate with the first seal material portion thereon;

following said tempering step, providing a plurality of spacers between the first and second substrates;

heating the first seal material portion to a seal forming temperature less than a maximum temperature achieved during said tempering step in forming a seal that defines a sealed space between the substrates; and causing the sealed space to be at a pressure less than atmospheric.

2. The method of claim 1, wherein said heating step comprises selecting at least a maximum seal forming temperature so that the tempered glass substrates retain at least about 50% of their original temper strength after said heating step is complete.

3. The method of claim 1, wherein:

said step of providing a first seal material further comprises providing a second seal material portion on the other of the first and second substrates, and providing the first and second seal material portions on major surfaces of the first and second glass substrates, respectively; and arranging the first and second substrates with spacers therebetween so that said first and second seal material portions are approximately aligned with and contact one another prior to said heating step.

4. The method of claim 1, further comprising:

providing a second seal material portion on the other of the substrates prior to said tempering step; and after said tempering step, providing a third seal material portion in contacting relation with each of the first and second seal material portions so that said heating step causes the first, second and third seal material portions to form the seal.

5. The method of claim 1, wherein said step of providing the first seal material portion on at least one of the substrates further comprises providing the first seal material portion including solder glass material and in the form of a wet slurry.

* * * * *